(12) United States Patent
Frantz et al.

(10) Patent No.: US 7,097,804 B2
(45) Date of Patent: Aug. 29, 2006

(54) THERMOPLASTIC LAMINATE DUCT

(75) Inventors: Walter Forrest Frantz, North Bend, WA (US); Danny A. Jorgenson, Spokane, WA (US); Denis J. Klein, Roswell, GA (US); Douglas D. Maben, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 10/216,110

(22) Filed: Aug. 9, 2002

(65) Prior Publication Data
US 2004/0050487 A1 Mar. 18, 2004

(51) Int. Cl.
B29C 53/00 (2006.01)

(52) U.S. Cl. ........................ 264/285; 264/339; 425/363

(58) Field of Classification Search ................ 264/280, 264/285, 319, 322, 339; 425/363; 138/155; 285/179, 181, 183
See application file for complete search history.

(56) References Cited

U.S. PATENT DOCUMENTS

| 193,847 | A | * | 8/1877 | Choate ..................... 285/183 |
| 244,720 | A | * | 7/1881 | Hildebrandt ............... 285/181 |
| 2,388,297 | A | * | 11/1945 | Slaughter .................... 428/53 |
| 2,823,703 | A | | 2/1958 | Nusser, Jr. |
| 3,512,805 | A | * | 5/1970 | Glatz ........................ 285/109 |
| 4,068,622 | A | | 1/1978 | Vola |
| 4,093,683 | A | * | 6/1978 | Harley ...................... 264/295 |
| 4,099,749 | A | | 7/1978 | van Vliet |
| 4,558,892 | A | * | 12/1985 | Daw et al. .................. 285/331 |
| 4,559,765 | A | | 12/1985 | Cress et al. |
| 4,807,370 | A | * | 2/1989 | Trimble ....................... 33/529 |
| 5,225,016 | A | | 7/1993 | Sarh |
| 5,360,584 | A | * | 11/1994 | Hansen et al. ............. 264/470 |
| 5,473,815 | A | | 12/1995 | Sonden et al. |
| 5,505,813 | A | | 4/1996 | Scheifele et al. |
| 5,573,716 | A | * | 11/1996 | Jacobson ................... 264/40.7 |
| 5,635,014 | A | | 6/1997 | Taylor |
| 6,140,411 | A | | 10/2000 | Schwamborn et al. |
| 6,284,089 | B1 | | 9/2001 | Anderson et al. |
| 2002/0117229 | A1 | | 8/2002 | Luettgen et al. |

FOREIGN PATENT DOCUMENTS

| CA | 2 367 573 | 7/2002 |
| GB | 812956 | 5/1959 |
| GB | 1 301 858 | 1/1973 |
| GB | 1 403 744 | 8/1975 |
| GB | 1 429 220 | 3/1976 |

OTHER PUBLICATIONS

CETEX® Application in Ducting; Ten Cate Advanced Composites Technical Document Nr ITD5235.017; Oct. 1990; pp. 1-10; Nijverdal, The Netherlands.

(Continued)

Primary Examiner—Harold Joyce
(74) Attorney, Agent, or Firm—Alston & Bird LLP

(57) ABSTRACT

A duct formed of a thermoplastic material is lightweight, strong, flame and smoke resistant, and non-toxic. The duct is formed from a flat laminate and does not require a specialized, disposable mandrel for supporting conventional thermoset plies. Preferably, the duct is formed from a preform, which is cut according to the desired shape and size of the duct so that trimming after the duct has been formed is not required. Additionally, features such as holes and spud locations can be provided by cutting or marking the preform before forming the duct. Each duct can be formed of multiple articulated segments that are joined by connectors.

17 Claims, 7 Drawing Sheets

OTHER PUBLICATIONS

A short note on Duct Manufacturing for Aircraft Environmental Control Systems using CETEX Continuous fiber reinforced thermoplastic; Ten Cate Advanced Composites Technical Document Nr ITD5241.002; 1992; pp. 1-6; Nijverdal, The Netherlands.

* cited by examiner

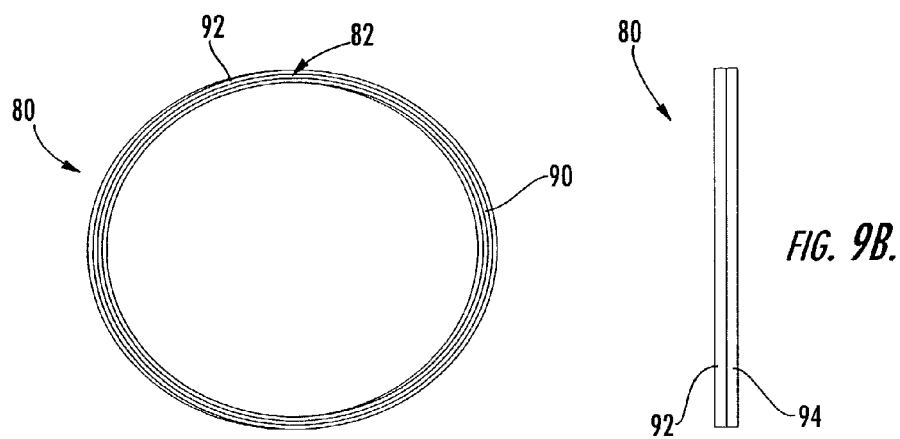
FIG. 9A.
FIG. 9B.
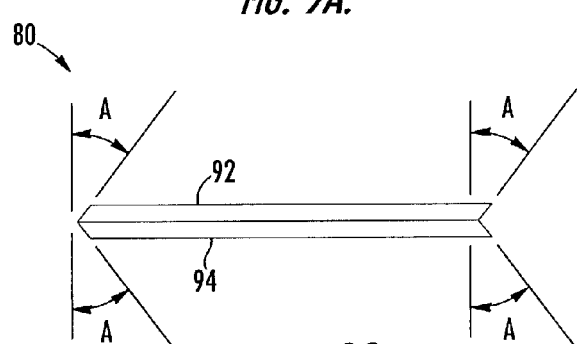
FIG. 9C.
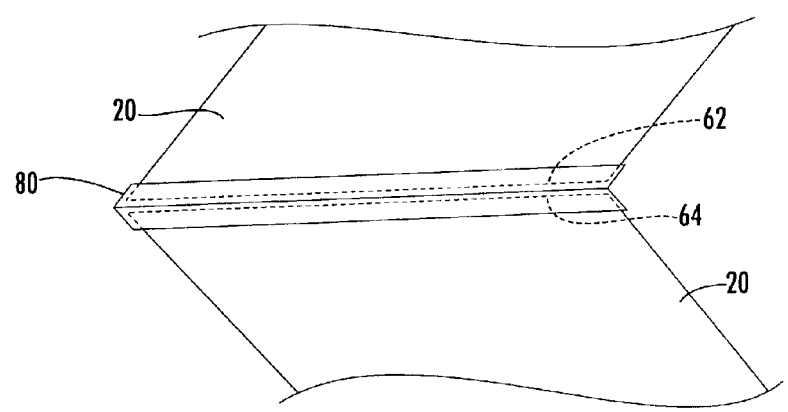
FIG. 9D.

THERMOPLASTIC LAMINATE DUCT

BACKGROUND OF THE INVENTION

1) Field of the Invention

The present invention relates to ducts and, more specifically, to ducts formed of thermoplastic laminates and preforms and methods for forming such ducts.

2) Description of Related Art

Ducts provide transport passageways for a wide variety of applications. For example, tubular ducts are widely used for air flow in aircraft environmental control systems. Similarly, ducts provide passageways for transporting gases for heating and ventilation in other vehicles and in buildings. Water distribution systems, hydraulic systems, and other fluid networks also often use ducts for fluid transport. In addition, solid materials, for example, in particulate form can be delivered through ducts. Ducts for the foregoing and other applications can be formed of metals, plastics, ceramics, composites, and other materials.

One conventional aircraft environmental control system utilizes a network of ducts to provide air for heating, cooling, ventilation, filtering, humidity control, and/or pressure control of the cabin. In this conventional system, the ducts are formed of a composite material that includes a thermoset matrix that impregnates, and is reinforced by, a reinforcing material such as Kevlar®, registered trademark of E. I. du Pont de Nemours and Company. The thermoset matrix is typically formed of an epoxy or polyester resin, which hardens when it is subjected to heat and pressure. Ducts formed of this composite material are generally strong and lightweight, as required in many aircraft applications. However, the manufacturing process can be complicated, lengthy, and expensive, especially for specially shaped ducts such as curved ducts and ducts that include a spud or attached fitting, a bead, a bell or flared portion, a conical section, or another contour. For example, curved ducts are conventionally formed around a disposable plaster mandrel. The plaster mandrel is formed in a specially shaped rotatable tool that acts as a mold to form the plaster mandrel according to the desired shape of the duct. First, a cavity of the tool is partially filled with uncured plaster, and the tool is rotated so that the plaster coats an inner surface of the tool cavity. When the plaster is partially cured to form the mandrel, the tool is stopped and opened so that the plaster mandrel can be removed and placed in an oven for subsequent curing. The mandrel is then treated with a sealant, cured again, and treated with a release agent. Plies of fabric, such as Kevlar®, preimpregnated with the thermoset material are cut and draped over the mandrel, often by hand, and a heat gun is used to mold the plies to the shape of mandrel. The mandrel is placed in a vacuum bag, which is fitted with one or more valves, and air is evacuated from the bag through the valves so that the bag urges the plies against the mandrel and consolidates the plies while heat is applied to cure the plies and form the duct. When the plies are cured, the vacuum bag is removed and the plaster mandrel is broken and removed from the duct. The duct is cleaned and trimmed to the desired dimensional characteristics. A jig that corresponds to the desired shape of the duct is often used for trimming the duct and for accurately locating additional features on the duct such as holes, spuds, brackets, and the like. Further processing is sometimes necessary for adding a bead or bell so that one or both ends of the duct can be secured and sealed to another duct. Typically, a bead is formed by adding additional material, thus adding weight to the duct. Insulation can also be added to the inside and/or outside of the duct.

The manufacturing process for such reinforced thermoset ducts is complicated, time consuming, and expensive. The rotatable tool used to mold the plaster mandrel is specially sized and shaped for creating a duct of specific dimensions, so numerous such tools must be produced and maintained for manufacturing different ducts. The plaster mandrel is formed and destroyed during the manufacture of one duct, requiring time for curing and resulting in plaster that typically must be removed or destroyed as waste. Additionally, the preimpregnated plies change shape while being cured and consolidated and therefore typically must be trimmed after curing to achieve the desired dimensions. The jigs required for trimming and for locating the proper positions for features such as holes and spuds are also typically used for only a duct of particular dimensions, so numerous jigs are required if different ducts are to be formed. Like the rotatable tools used for forming the mandrels, the jigs require time and expense for manufacture, storage, and maintenance.

Additionally, ducts formed of common thermoset epoxies do not perform well in certain flammability, smoke, and toxicity tests, and the use of such materials can be unacceptable if performance requirements are strict. For example, changes in environmental laws or proposed changes to performance requirements mandated by the Federal Aviation Administration would prevent the use of ducts formed from some thermoset composites in certain aircraft environmental control system applications.

Thus, there exists a need for an improved duct and method of forming a duct that reduces complexity and increases cost efficiency. Preferably, the method should not require the formation of a special rotatable tool and plaster mandrel for each duct or special hand tool for hand lay-up. The duct should be compatible with efficient methods for forming beads and bells and for locating other features, preferably without the use of an expensive jig that is duct-specific. Additionally, the duct should be lightweight and strong and should meet strict flammability, smoke, and toxicity standards.

SUMMARY OF THE INVENTION

The present invention provides a duct formed of a thermoplastic laminate and an associated preform and method. The duct is lightweight, strong, and performs well in flammability, smoke, and toxicity tests. The duct is formed by configuring a flat laminate and does not require a disposable plaster mandrel for supporting plies, a duct-specific rotatable tool for forming such a mandrel, or a special hand lay-up tool. Locations for features such as holes and spuds can be determined before the duct is formed from the laminate. Additionally, the duct can be formed to provide beads and bells without the addition of material.

In one embodiment, the present invention provides an articulated thermoplastic laminate duct that includes a plurality of duct segments, which are formed of thermoplastic laminate, for example, a composite material that includes a thermoplastic matrix such as polyetherimide or polyphenol sulfide and a reinforcing material such as fabric or fibers formed of an aramid, carbon, or glass. First and second duct segments are connected to define a continuous passage therein, for example, by a flexible connector between ends of the duct segments, which are otherwise offset with a longitudinal axis of the first duct segment being angled relative to a longitudinal axis of the second duct segment. According to one aspect of the invention, the flexible connector defines first and second elongate portions which are partially enclosed. Each portion defines an opening for receiving the end of a respective duct segment, and the portions are connected so that the openings are generally outwardly opposed to each other.

The present invention also provides a thermoplastic laminate preform for manufacturing a duct segment of an articulated duct. The preform includes a flat sheet of thermoplastic laminate that defines a flat geometric pattern corresponding to the desired shape of the duct segment so that the sheet can be configured to generally define the desired shape of the duct segment, which defines a passage. The sheet can be formed of a composite material that includes a thermoplastic matrix such as polyetherimide or polyphenol sulfide, and a reinforcing material such as an aramid, carbon, or glass. Construction data can be disposed on the perform, including a duct segment identification mark, an orientation mark, a radial alignment mark, a spud location mark, a detail location mark, and/or a cuff location mark. According to one aspect of the invention, the flat geometric pattern is at least partially defined by a sinusoidal curve and/or arc that is based on a number of duct segments required to form the articulated duct, a curvature of the articulated duct, a diameter of an inlet of the articulated duct, a diameter of the outlet of the articulated duct, a bend radius of the duct segment, a desired location for the seam of the duct segment, a seam overlap, and a desired deformation of the inlet and outlet of the articulated duct.

The present invention also provides methods of forming a thermoplastic laminate preform and duct. The preform, which generally corresponds to a desired shape of a first duct segment, can be formed by impregnating a reinforcement material with thermoplastic to form a flat sheet, determining a flat geometric pattern that generally corresponds to the desired shape of the first duct segment, and cutting the sheet according to the flat geometric pattern. Preferably, the geometric pattern is determined such that the duct segment is consolidated to the desired shape of the first duct segment without trimming the segment after consolidation. For example, the dimensions of the flat geometric pattern can be calculated at least partially according to a sinusoidal curve and/or arc based on a number of duct segments for an articulated duct, a curvature of the articulated duct, a diameter of an inlet of the articulated duct, a diameter of the outlet of the articulated duct, a bend radius of the first duct segment, a desired seam location, a seam overlap, and desired deformations of the inlet and outlet of the duct. The duct is formed by configuring the perform to approximate the desired shape of the first duct segment, which defines a passage, and consolidating the preform to form the first duct segment. According to one aspect of the invention, the methods also include marking the sheet with construction data such as a duct identification mark, an orientation mark, a radial alignment mark, a spud location mark, a detail location mark, and/or a cuff location mark. According to another aspect, the first duct segment is connected to at least a second duct segment so that the passage defined by the first duct segment is fluidly connected to a passage defined by the second duct passage. For example, the ducts segments can be connected by joining a flexible connector to opposing ends of the duct segments. The first duct segment can be connected to the second duct segment such that longitudinal axes of the duct segments are angled relative to one another and the segments in combination at least partially form an articulated duct.

BRIEF DESCRIPTION OF THE DRAWINGS

Figure 1:
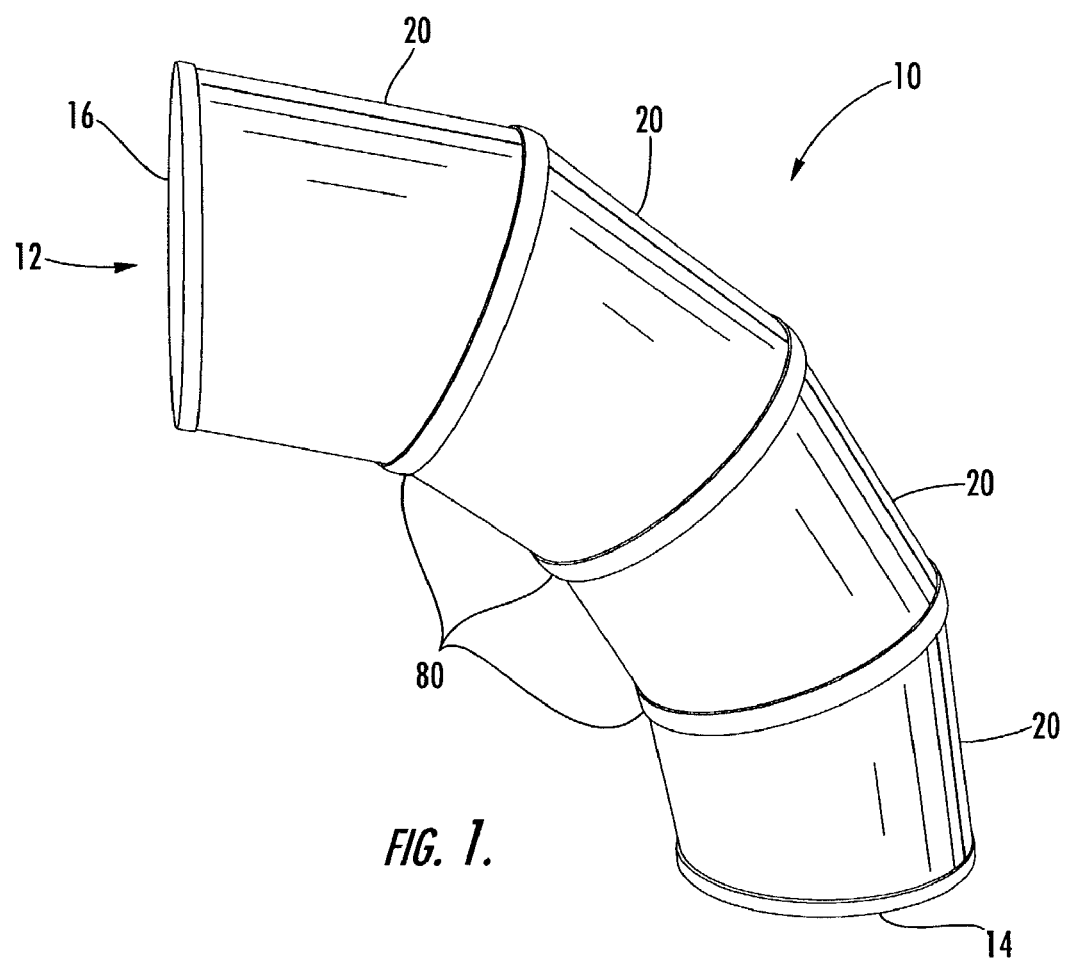
Figure 2:
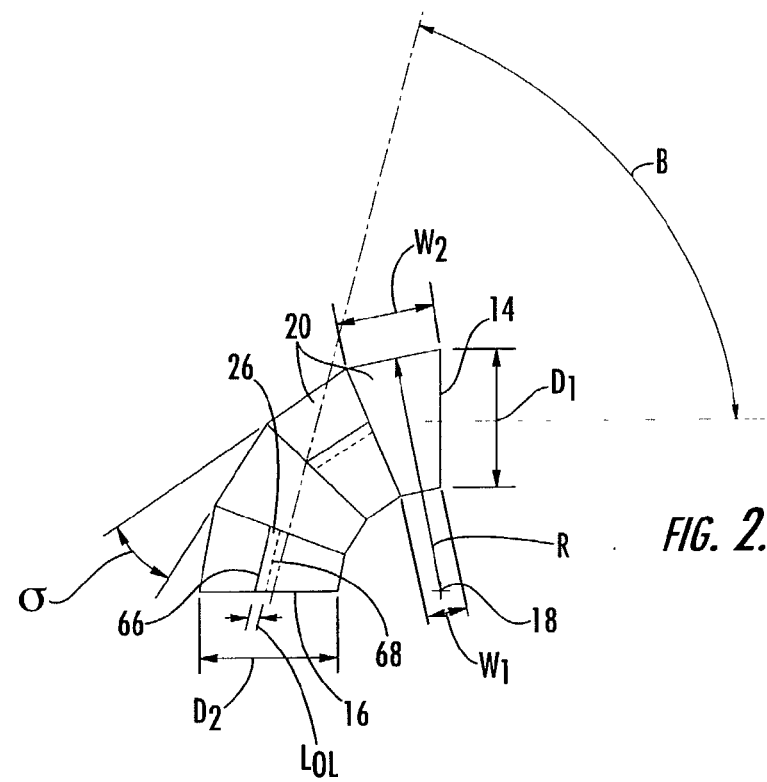
Figure 3:
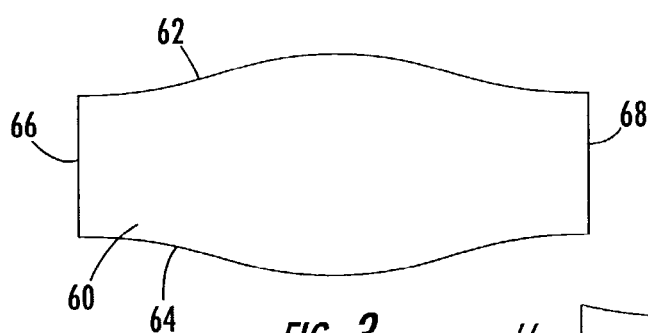
Figure 4:
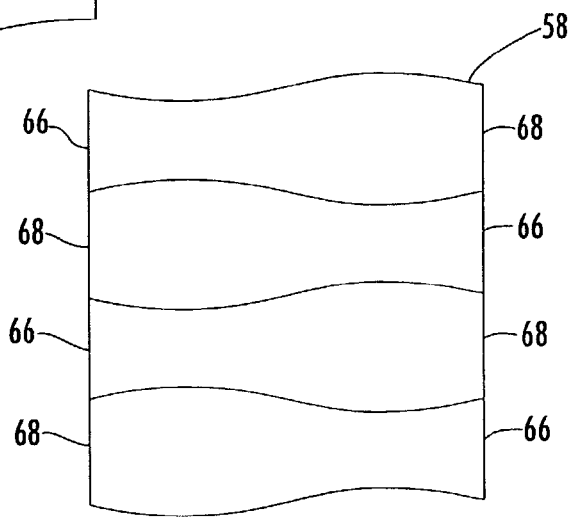
Figure 5:
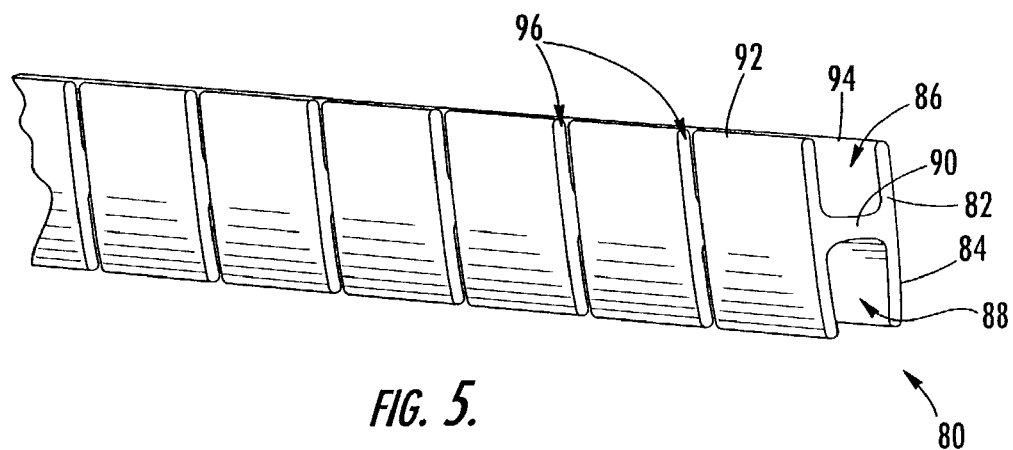
Figure 6:
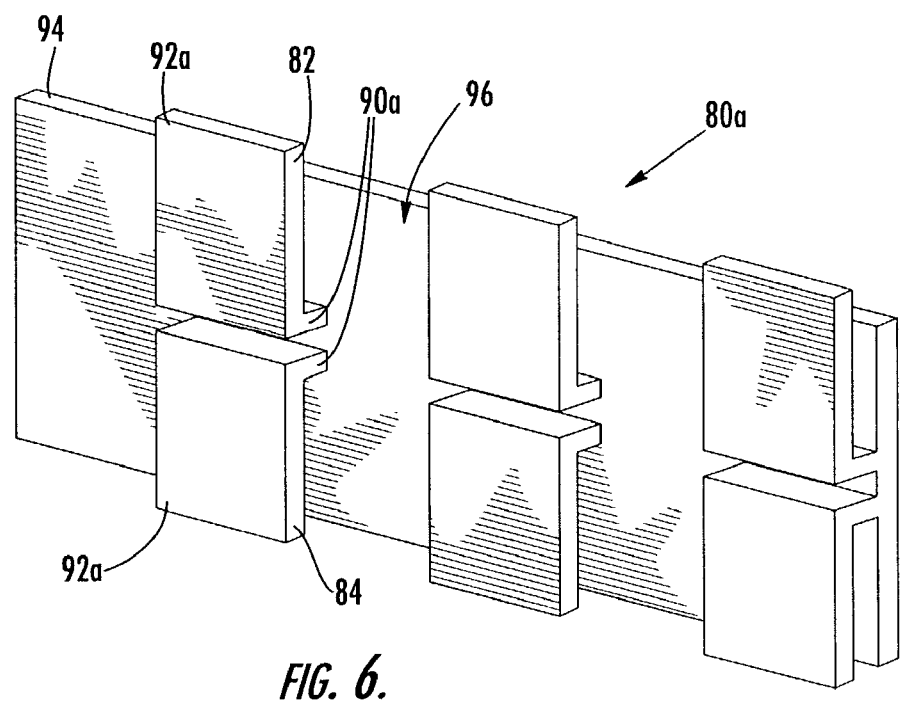
Figure 7:
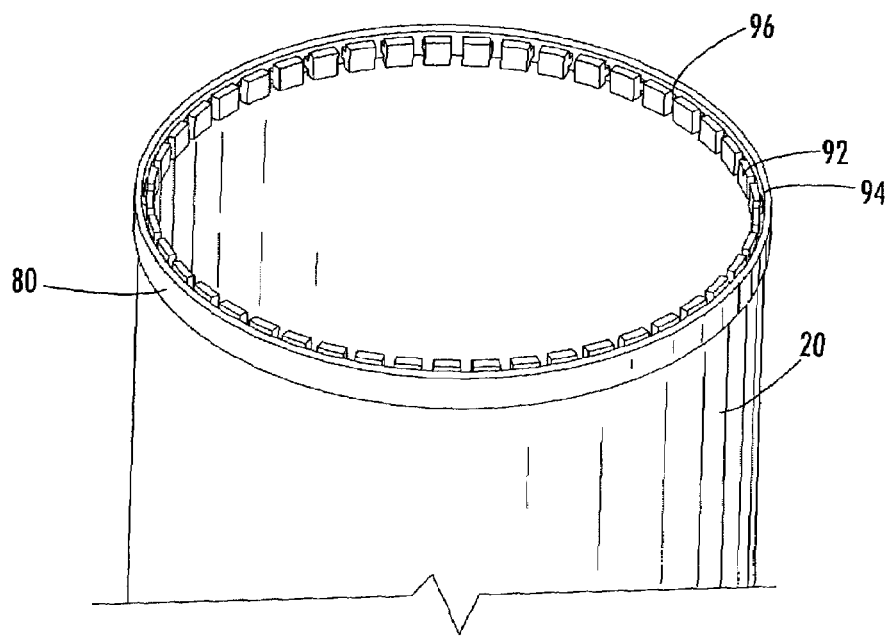
Figure 8:
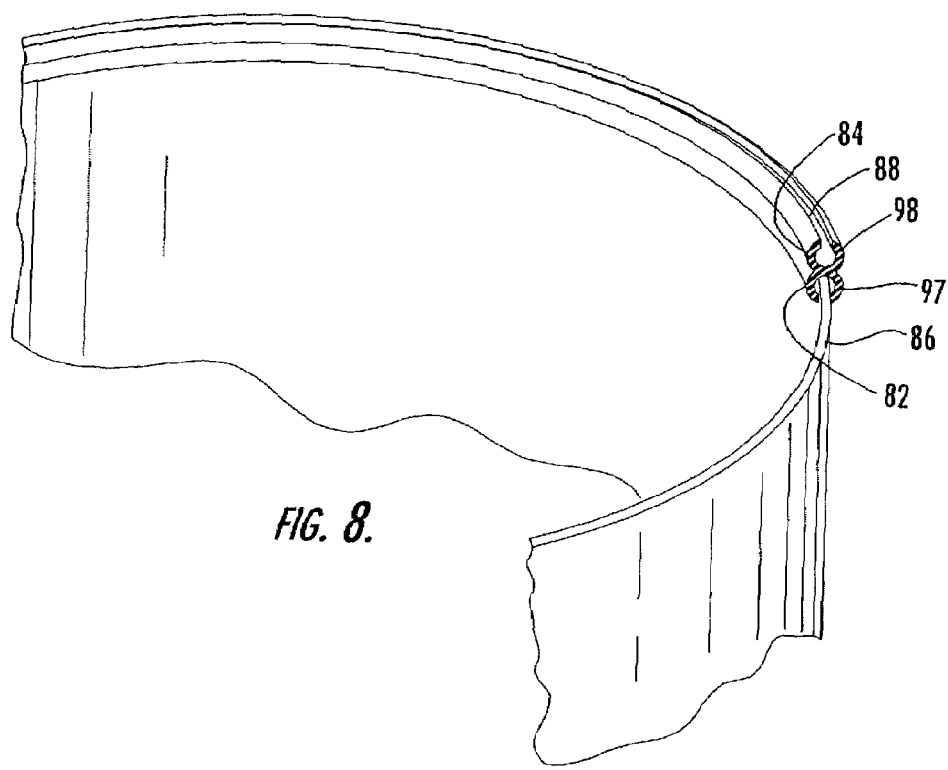
Figure 9:
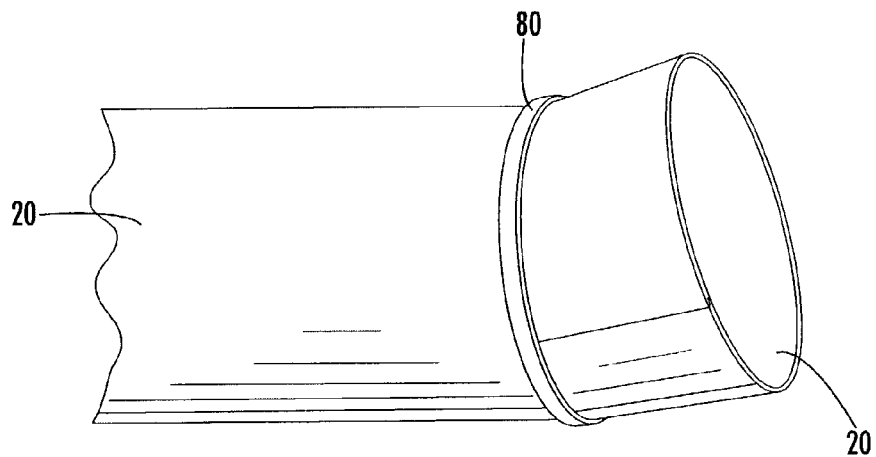
Figure 10:
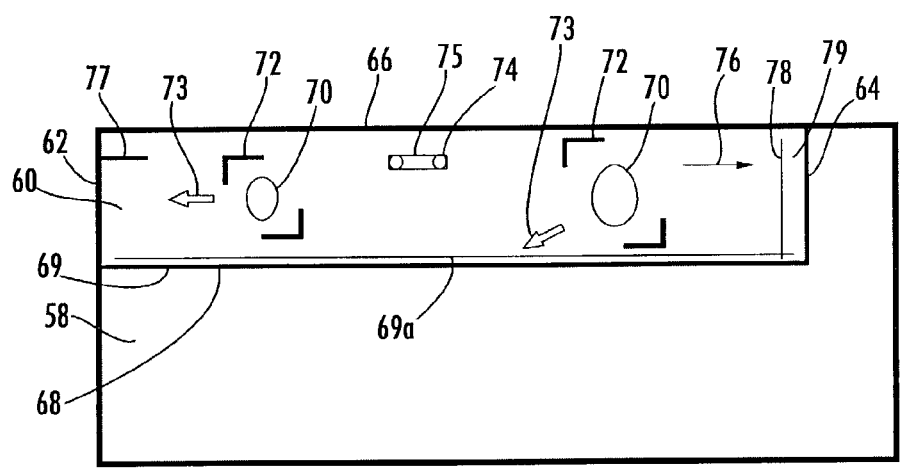
Figure 11:
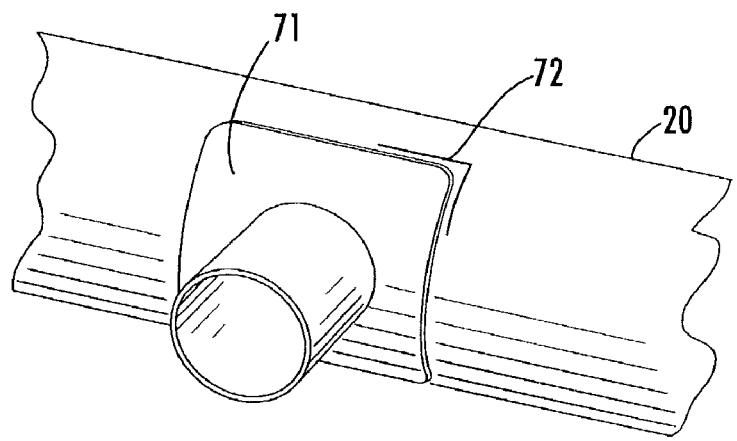
Figure 12:
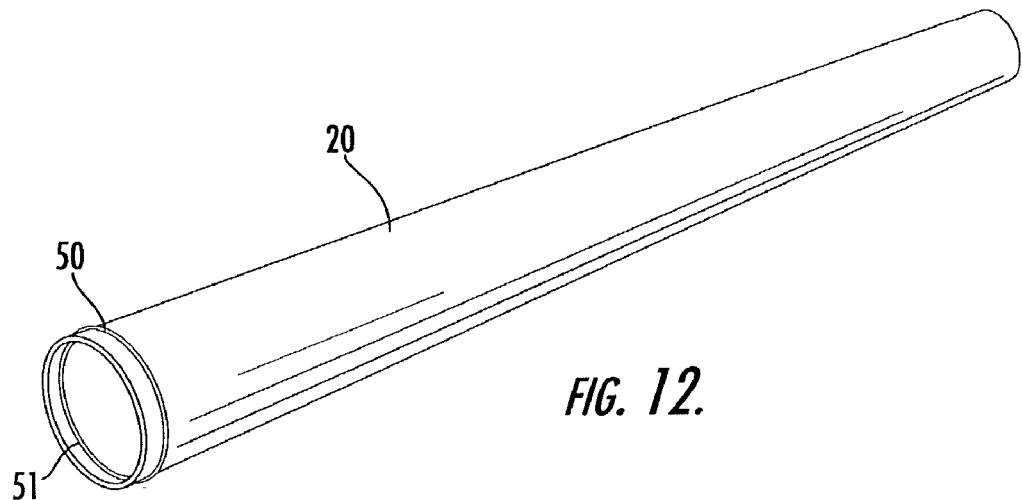

Having thus described the invention in general terms, reference will now be made to the accompanying drawings, which are not necessarily drawn to scale, and wherein:

FIG. 1 is a perspective view of a duct formed of four duct segments according to one embodiment of the present invention;

FIG. 2 is an elevation view of the duct of FIG. 1 illustrating several dimensions of the duct;

FIG. 3 is plan view of a preform for forming a duct segment according to one embodiment of the present invention;

FIG. 4 is a plan view of a flat sheet of a thermoplastic laminate, showing the layout of four preforms according to another embodiment of the present invention;

FIG. 5 is a perspective view of an elongate flexible connector according to one embodiment of the present invention;

FIG. 6 is a perspective view of an elongate flexible connector according to another embodiment of the present invention;

FIG. 7 is a perspective view of the connector of FIG. 5 disposed on a duct segment according to one embodiment of the present invention;

FIG. 8 is a perspective view of an elongate flexible connector disposed on a duct segment according to another embodiment of the present invention;

FIG. 9 is a perspective view of two duct segments joined by a flexible connector according to one embodiment of the present invention;

FIG. 9A is a plan view of an elongate connector according to another embodiment of the present invention;

FIG. 9B is a side view of the right side of the elongate connector of FIG. 9A;

FIG. 9C is a side view of the bottom side of the elongate connector of FIG. 9A;

FIG. 9D is a partial view of two duct segments joined by the elongate connector of FIG. 9A;

FIG. 10 is a plan view of a flat thermoplastic laminate sheet, showing the layout of a preform with spud and detail marks according to one embodiment of the present invention;

FIG. 11 is a perspective view of a duct segment with a spud according to one embodiment of the present invention; and FIG. 12 is a perspective view of a duct segment with a bead according to one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, there is shown an articulate duct 10 according to one embodiment of the present invention. The duct 10 is formed of straight duct segments 20, four in this embodiment, which are connected by connectors 80 such that the duct segments 20 define a continuous passage 12 extending from an inlet 14 to an outlet 16. The duct 10 can be used in numerous applications including, but not limited to, environmental control systems of aerospace vehicles, in which air is delivered through the passage 12 of the duct 10 to provide heating, cooling, ventilation, filtering, humidity control, and/or pressurization to an aircraft cabin. The inlet 14 and outlet 16 of the duct 10 can be connected to other ducts or other devices such as heaters, air conditioners, ventilators, filters, compressors, and the like. The duct segments 20 are connected so that a longitudinal axis of each duct segment 20 is configured at an angle relative to the longitudinal axis of the adjoining duct segment(s) 20. Thus, the duct 10 defines an articulated shape and the inlet 14 and outlet 16 are angled relative to one another. Alternatively, the duct segments 20 can be connected to form a straight duct 10.

The ducts segments 20 are formed of a thermoplastic laminate. Thermoplastic materials are characterized by a transition to a plastic state when heated above a glass transition temperature and a return to a non-plastic state when cooled to a temperature below the glass transition temperature. For example, the duct segments 20 can be formed of polyetherimide (PEI) or polyphenol sulfide (PPS), both of which can be thermoplastic. Thermoplastic PEI, available under the trade name Ultem®, a registered trademark of General Electric Company, typically becomes plastic at temperatures above about 417° F. According to one embodiment of the present invention, each segment 20 is formed of a composite material that includes a matrix of thermoplastic PEI that is reinforced with a reinforcing material such as a fabric or fibers of carbon, glass, or an aramid fabric such as Kevlar®. Fabrics of these and other reinforcing materials can be prepared by various methods as are known in the art. For example, numerous types of chopped fiber and weave patterns can be used, including a 0/90 degree crowfoot fiber weave. Alternatively, the segments 20 can be formed of other thermoplastic materials, which can be reinforced by other reinforcing materials, or can include no reinforcing materials.

For clarity of reference, there are illustrated in FIG. 2 several dimensions of the duct 10. As shown, the inlet 14 of the duct 10 has first diameter $D_1$ and the outlet 16 has a second diameter $D_2$. The diameters $D_1$, $D_2$ can be different, but as shown in the embodiment of FIG. 2, the diameters $D_1$, $D_2$ are equal and hereinafter referred to similarly as the diameter D. Each duct segment 20 defines a first segment width $W_1$ and a second segment width $W_2$. In the illustrated embodiment, the second segment width $W_2$ of each duct segment 20 is longer than the first segment width $W_1$, and the duct segments 20 are configured so that the duct 10 is articulated about a duct center 18. The articulation of the duct 10 depends on an angle σ between adjoining duct segments 20. The angle σ is measured between adjoining duct segments 20 at the outermost portion of the duct segments, i.e., where the second segment width $W_2$ occurs. However, the angle σ can alternatively be measured elsewhere, for example, between the longitudinal axes of adjoining duct segments 20. An angle B is equal to the sum of the individual angles σ of the duct segments 20. Thus, the angle B is the total articulation of the duct 10. A bend radius R is measured as the distance between the duct center 18 and the outermost portion of the duct segments 20, though the bend radius R can also be measured elsewhere, for example, between the center 18 and the longitudinal axes of the duct segments 20.

A preform 60 for forming one of the duct segments 20 is shown in FIG. 3. The preform 60 is formed from a flat sheet 58 formed of a thermoplastic laminate, as shown in FIG. 4. The preform 60 defines first and second ends 62, 64 and first and second side edges 66, 68. The preform 60 is configured to form one of the duct segments 20 by bending the preform 60 so that the first and second side edges 66, 68 are brought together. The preform 60 can be bent in a circular cross section or another shape such as a square, rectangle, triangle, ellipse, and the like. The first and second side edges 66, 68 are joined to form a seam 26 so that the duct segment 20 defines a closed polygonal cross section defining the passage 12. Preferably, one of the first or second side edges 66, 68 overlays a portion of the other edge 66, 68 by a distance designated as a seam overlap $L_{OL}$ as shown in FIG. 2. An angular location S of the seams 26 can be staggered on the duct 10.

The preform 60 can be bent and configured manually or by an automated machine. Methods of configuring a preform are provided in U.S. application Ser. No. 10/215,815, titled "Preforming Thermoplastic Ducts," filed concurrently herewith, the entirety of which is incorporated herein by reference. Preferably, the portion of the duct segment 20 at the seam 26 is consolidated and joined using glue, heat, or other joining methods. Joining is typically achieved by applying heat and pressure to the edges 66, 68 to form the seam 26. As the thermoplastic material of the duct segment 20 is heated above its glass transition temperature, the material becomes plastic and the pressure consolidates and joins the overlapped material tat makes up the seam overlap $L_{OL}$. Joining can be performed by manual or automated methods, for example, as described in U.S. application ser. No. 10/215,833, titled "Consolidation Joining of Thermoplastic Laminate Ducts," filed concurrently herewith, the entirety of which is incorporated herein by reference.

The shape of the preform 60 is determined by projecting the desired shape of the duct segment 20 onto the flat laminate sheet 58. For example, the duct segments 20 shown in FIGS. 1 and 2 can be formed from preforms 60 as shown in FIG. 4. The preform 60 shown in FIG. 3 can also be used to form the duct segments 20 of FIGS. 1 and 2, though the symmetrical preform 60 of FIG. 3 would result in a duct segment 20 with the seam 26 located at the narrowest section of the duct segment 20, i.e., the radially innermost portion of the duct 10 relative to the duct center 18. Thus, each duct segment 20 can be formed from preforms 60 of different shapes, and the shape of the preform 60 can be modified to affect the angular seam location S for each duct segment 20. In the embodiment illustrated in FIG. 2, the seams 26 are staggered so that the seam 26 of each duct segment 20 is located at an angular position S that is 180° away from the seams 26 of the adjoining duct segments 20.

Preferably, at least one of the first and second ends 62, 64 of each preform 60 are curved as shown in FIG. 3 so that the first end 62 of one of the duct segments 20 can be engaged with and connected to the second end 64 of another one of the duct segments 20 without a gap between the duct segments 20. According to one embodiment of the invention, at least one of the first and second ends 62, 64 of each preform 60 is at least partially defined by a sinusoidal curve that is based on the following characteristics of the duct 10 and duct segments 20: a number N of duct segments 20 connected to form the duct 10, the angle B of articulation of the duct 10, the duct diameter D, the bend radius R, the desired angular position S for the seam 26 of each of the duct segments 20, the seam overlap $L_{OL}$, and a desired deformation of the inlet and/or outlet 16 of the duct 10. Possible deformations that can be formed in the duct segment 20 include bells and beads, as described below. For example, in one embodiment, the diameter D of the duct 10 is uniform throughout, and a length L of each preform 60, measured as the distance between the first and second side edges 66, 68 is equal to $$D \times \pi + L_{OL}$$

where π is an irrational constant approximately equal to 3.1415. The first segment width $W_1$ is equal to $$2\left(R - \frac{D}{2}\right) \times \sin\left(\frac{B}{2N}\right),$$

and the second segment width $W_2$ is equal to $$2\left(R + \frac{D}{2}\right) \times \sin\left(\frac{B}{2N}\right).$$

When the diameters $D_1$, $D_2$ are the same, i.e., equal to the diameter D, the curved first and second ends 62, 64 are symmetric as shown in FIGS. 3 and 4, and one end 62, 64 is described by the function $$f(x) = \pm D \sin\left(\frac{B}{2N}\right)\left[R \pm 0.5 \sin\left(\frac{360x}{D\pi} + S\right)\right]$$

where the desired angular seam location S is expressed as an angle, the variable x is defined along the length L of the duct segment, and the function f(x) is measured perpendicular to the variable x. As shown in FIG. 4, multiple preforms 60 can be formed from a single thermoplastic laminate sheet 58, and the preforms 60 can be configured in a nested arrangement on the sheet 58 to minimize wasted material.

There is shown in FIG. 5 the flexible connector 80 that is used to connect the duct segments 20 to form the duct 10 according to one embodiment of the present invention. The flexible connector 80 is an elongate member, which defines first and second partially enclosed portions 82, 84 that define first and second openings 86, 88 respectively for receiving one of the ends 62, 64 of one of the duct segments 20. The first and second openings 86, 88 are generally outwardly opposed to one another such that the duct segments 20 attached to the connector 80 extend therefrom in generally opposing directions. In the embodiment shown in FIG. 5, the connector 80 defines an elongate web 90 from which extend first and second flanges 92, 94 that form the partially enclosed portions 82, 84. Either or both of the flanges 92, 94 can define gaps 96 that increase the flexibility of the connector 80. The gaps 96 can also extend through the web 90, as illustrated by an alternative connector 80a illustrated in FIG. 6, which provides separate webs 90a for supporting individual flange tabs 92a. Preferably, the connector 80 is attached to a duct segment 20 such that the first partially enclosed portion 82 receives one of the ends 62, 64 of the duct segment 20 through the first opening 86, and such that the gaps 96 are directed radially inward, or toward the passage 12 of the duct 10, as shown in FIG. 7. Another alternative connector 80b is shown in FIG. 8. The connector 80b defines two connected elongate tubes 97, 98 each of which defines one of the openings 86, 88 and one of the partially enclosed portions 82, 84. FIG. 9 illustrates two duct segments 20 that are connected via a connector 80. Preferably, the connector 80 holds the two segments 20 together and also hermetically seals the passage 12 of the duct 10. The connector 80 can be glued in place. Alternatively, the connector 80 and/or the duct segments 20 can be heated until at least partially plasticized and consolidated to join the connector 80 to the duct segments 20. Consolidation can be performed by pressing the connector 80 against the duct segments 20 manually or using an automated mechanism.

The connector 80 can define a uniform cross-sectional shape along its length, as shown in FIGS. 5–9, or the cross-sectional shape can vary along the length of the connector 80, for example, to better accommodate the articulated configuration of the duct segments 20 joined by the connector 80. The connector 80 shown in FIGS. 9A–9D is elliptical to correspond to the shape of ends 62, 64 of the two cylindrical duct segments 20, as shown in FIG. 9D. The first and second flanges 92, 94 of the connector 80 do not define gaps 96, but the flanges 92, 94 are angled relative to the web 90. Further, the flanges 92, 94 are non-uniform along the connector 80. Specifically, the flanges 92, 94 are perpendicular to the web 90 at one or more locations along the connector 80, as shown in FIG. 9B, and vary from the perpendicular configuration by an angle A along the length of the connector 80. For example, the angle A can vary to a maximum of B/2N as shown in FIG. 9C. Thus, the partially enclosed portions 82, 84 define the angle A therebetween, and the angle A varies along the connector 80 such that the connector 80 is configured to receive the ends 62, 64 of the duct segments 20, which meet at an oblique angle, which can be equal to the angle A, as shown in FIG. 20 to form the articulated duct 10.

Preferably, the preform 60 is formed of a thermoplastic laminate that can be formed and consolidated uniformly and predictably so that features that are desired to be located at specific positions on the duct segment 20 can first be located on the preform 60 and, as the preform 60 is configured to form the duct segment 20, the features are moved to the desired positions. For example, FIG. 10 illustrates a layout of the preform 60 on the thermoplastic laminate sheet 58. The perimeter of the preform 60 is demarcated by a line 69, along which the preform 60 can be cut from the sheet 58. The preform 60 includes spud holes 70 for attaching spuds 71, or fittings, to the duct segment 20, as shown in FIG. 11. The spuds 71 can be connected to the duct segment 20 by heating one or both of the spud 71 and the duct segment 20 and pressing the spud 71 into the spud hole 70. Adhesives, mechanical fasteners such as screws, bolts, clips, or rivets, and other joining devices or methods can be also be used to fasten the spuds 71 to the duct segment 20. Preferably, the spud holes 70 are bores defined by the preform 60 before the preform 60 is formed into the duct segment 20, but the location of the spud holes 70 can alternatively be marked on the preform 60 and formed by drilling the duct segment 20 after the preform 60 has been formed into the duct segment 20. Spud location marks 72 and/or spud orientation marks 73 are used to identify each spud hole 70 and/or indicate the desired position and orientation of the spud 71. The spud location marks 72 can show part of the outline of the spud 71 that is to be connected to the duct segment 20, e.g., the corners, so that the spud 71 can be quickly and accurately positioned on the duct segment 20, preferably without the use of a special jig. If there is more than one orientation of the spud 71 in which the spud 71 corresponds to the location marks 72, and a particular orientation of the spud 71 on the duct segment 20 is desired, the orientation marks 73 can also be provided. For example, each spud orientation mark 73 can include an arrow, as shown in FIG. 10, which indicates the desired directional orientation of the spud 71 that is to be connected to the duct segment 20.

The preform 60 can include other holes and/or marks for additional features, such as detail holes 74 and detail marks 75 for receiving detail devices. The detail holes and marks 74, 75 are similar to the spud holes 70, location marks 72, and orientation marks 73. For example, two detail holes 74 can be provided for receiving bolts or other fasteners for connecting a bracket (not shown) or other detail device to the duct segment 20. The detail marks 75 provide an easily identifiable indicator of the desired placement and orientation of the detail device, simplifying the assembly and installation of the duct segments 20 and the duct 10. Duct orientation marks 76 can be used to indicate the desired orientation of the duct segment 20 or the duct 10. For example, the duct orientation marks 76 can include an arrow that indicates which end 62, 64 of the duct segment 20 should be connected to another duct segment 20 to form the duct 10. The duct orientation marks 76 can also indicate the location of the inlet 14 and/or outlet 16 of the duct 10 formed from the duct segment 20 and, therefore, how the duct 10 should be positioned during installation in a duct system. Angular alignment marks 77 indicate the desired angular alignment of the duct segment 20, for example, relative to a corresponding mark on another duct segment 20. Thus, an operator assembling two duct segments 20 can align the angular alignment marks 77 on the duct segments 20 to achieve the correct angular alignment therebetween. Cuff marks 78 located near the side edges 66, 68 of the preform 60 identify the location or length of a cuff 79 of the preform 60 or duct segment 20, i.e., the portion of the preform 60 or duct segment 20 that is used to join the duct segment 20 to another duct segment 20. For example, each cuff mark 78 can include a line parallel to the ends 62, 64 of the duct segment 20 that indicates how much of the duct segment 20 should be inserted into another duct segment 20 for joining thereto. A seam overlap line 69*a* can also be provided on the preform 60 to indicate the extent to which the side edges 66, 68 should be overlapped to form the seam 26, i.e., the length of the seam overlap $L_{OL}$.

It is appreciated that holes, marks, and other details can be provided on the preform 60 for locating detail devices other than spuds, brackets, and cuffs. For example, the preform 60 can be marked with lines or other marks to indicate the position of features that are to be formed subsequently in the duct segment 20, such as the desired location for a bell or bead for facilitating the connection of the duct segment 20 to another segment 20 or other device. FIG. 12 illustrates the duct segment 20 in which a bead 50 has been formed. Beads formed on conventional ducts formed of thermoset materials are typically formed by adding plies to the duct to build up the bead shape. The bead 50 of the present invention can be formed by such a build-up process, but preferably the bead 50 is formed by heating the thermoplast duct segment 20 to a temperature at which it becomes plastic and urging a tool against the duct segment 20 to deform the duct segment radially outward and form the bead 50. A discussion regarding the formation of duct features such as bells and beads is provided in U.S. application Ser. No. 10/215,780, titled "Post-Forming of Thermoplastic Ducts," filed concurrently herewith, the entirety of which is incorporated by reference. The bead 50, which extends radially outward, can be used to connect the duct segment 20 to another segment 20 or other device by inserting the beaded segment 20 into the other segment 20 or device. The formation of the bead 50 can also result in a recess 51 on the inner surface of the duct segment 20. The recess 51 can be used to receive the bead 50 of another duct segment 20 for connecting the duct segments 20. The calculated length L and/or widths $W_1$, $W_2$ of the preform 60 can be adjusted for the formation of a bead 50, bell, or other feature, which may affect the overall dimensions of the duct segment 20. Additionally, marks can be provided for identifying the duct segment 20 or the duct 10. For example, identifier marks (not shown) can be provided for indicating a model number, serial number, material type, and the like. One or all of the marks can correspond to data provided in manufacturing or assembly drawings.

The preform 60 can be cut from the sheet 58 using an automated oscillating knife, rotating blade, waterjet, scissors, or other cutting devices, and the holes 70, 74 can be drilled or cut using a drill, punch, or other such devices. The lines and marks 69, 69*a*, 72, 73, 75, 76, 77, 78 can be formed before, during, or after the preform 60 is cut from the sheet 58. For example, in one embodiment, a numerically controlled ultrasonic knife with a pen capability is used to cut the preform 60 and form the lines and marks 69, 69*a*, 72, 73, 75, 76, 77, 78 while the preform 60 is still flat.

According to one embodiment of the present invention, the duct 10 is formed by first forming the preform 60 from a flat sheet of thermoplastic laminate. The preform 60 is marked with construction data such as the preform demarcation lines 69, the spud holes 70, the spud location marks 72, the spud orientation marks 73, the detail holes 74, the detail marks 75, the orientation marks 76, the angular alignment marks 77, the cuff marks 78, the seam overlap line 69*a*, and the identification marks. Preferably, the preform 60 is cut according to a flat geometric pattern that generally corresponds to the desired shape of the duct segment 20 so that the preform 60 can be configured and consolidated to form the desired shape of the duct segment 20 without trimming the duct segment 20 after forming. For example, the preform 60 is cut along the demarcation lines 69, and the spud holes 70 and detail holes 74 are drilled in the preform 60. The preform 60 is configured, consolidated, and connected to one or more other duct segments 20 to form the continuous passage 12 therethrough using the elongate flexible connector 80. Preferably, the duct segments 20 are connected such that a longitudinal axis of each duct segment 20 is angled relative to a longitudinal axis of the duct segment(s) that are connected thereto, and the duct segments 20 form an articulated duct 10. The marks 72, 73, 75, 76, 77, 78 can be used as guides during construction, for example, when connecting the duct segments 20 to one another or when connecting spuds 71 or other devices to the duct segments 20.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A thermoplastic laminate preform for manufacturing a duct segment of an articulated duct, the preform comprising a flat sheet of thermoplastic laminate formed of a composite material including a thermoplastic matrix and a reinforcing material and defining a flat geometric pattern that corresponds to the desired shape of the duct segment defining a passage such that the sheet can be configured to generally define the desired shape of the duct segment, wherein the flat geometric pattern is at least partially defined by a sinusoidal curve.

2. A thermoplastic laminate preform according to claim 1 wherein construction data is disposed on the preform, the construction data including at least one of a duct segment identification mark, an orientation mark, a radial alignment mark, a spud location mark, a detail location mark, a seam overlap line, and a cuff location mark.

3. A thermoplastic laminate preform according to claim 1 wherein the flat geometric pattern is at least partially defined by a sinusoidal curve based on a number of duct segments required to form the articulated duct, a curvature of the articulated duct, a diameter of an inlet of the articulated duct, a diameter of the outlet of the articulated duct, a bend radius of the duct segment, a desired location for the seam of the duct segment, a sewn overlap, and a desired deformation of the inlet and outlet of the articulated duct.

4. A thermoplastic laminate preform according to claim 1 wherein said matrix comprises at least one of the group consisting of polyetherimide and polyphenol sulfide and said reinforcing material comprises at least one of the group consisting of an aramid, carbon, and glass.

5. A method of fanning a thermoplastic laminate duct, the method comprising:
   providing a thermoplastic laminate preform generally corresponding to a desired shape of a first duct segment;
   configuring the preform to approximate the desired shape of the first duct segment defining a passage; and
   consolidating the preform to form the first duct segment.

6. A method of forming a thermoplastic laminate duct according to claim 5, wherein said providing step comprises impregnating a reinforcement material with thermoplastic to form the preform.

7. A method of forming a thermoplastic laminate duct according to claim 5, wherein said providing step comprises:
   determining a flat geometric pattern that generally corresponds to the desired shape of the first duct segment; and
   cutting a flat sheet of thermoplastic laminate according to the flat geometric pattern.

8. A method of forming a thermoplastic laminate duct according to claim 7, further comprising marking the sheet with construction data including at least one of a duct identification mark, an orientation mark, a radial alignment mark, a spud location mark, a detail location mark, and a cuff location mark.

9. A method of forming a thermoplastic laminate duct according to claim 7, wherein said determining step comprises calculating the flat geometric pattern such that said consolidating step forms the first duct segment to the desired shape of the first duct segment without trimming the first duct segment after said consolidation step.

10. A method of forming a thermoplastic laminate duct according to claim 5, further comprising connecting the first duct segment to at least a second duct segment so that the passage defined by the first duct segment is fluidly connected to a passage defined by the second duct passage.

11. A method of forming a thermoplastic laminate duct according to claim 10, wherein said connecting step comprises joining a flexible connector to an end of the first duct segment and an opposing end of the second duct segment.

12. A method of forming a thermoplastic laminate duct according to claim 10, wherein said connecting step comprises connecting the first duct segment to at least the second duct segment such that a longitudinal axis of the first duct segment is angled relative to a longitudinal axis of the second duct segment and the first and second segments in combination at least partially form an articulated duct.

13. A method of forming a thermoplastic laminate duct according to claim 7, wherein said determining step comprises calculating dimensions of the flat geometric pattern at least partially according to a sinusoidal curve based on a number of duct segments for the articulated duct, a curvature of die articulated duct, a diameter of an inlet of the articulated duct, a diameter of the outlet of the articulated duct, a bend radius of the first duct segment, a desired seam location, a seam overlap, and desired deformations of the inlet and outlet of the articulated duct.

14. A method of forming a thermoplastic laminate preform for manufacturing a duct segment, the method comprising:
   providing a flat sheet of thermoplastic laminate generally corresponding to a desired shape of a first duct segment, the sheet being formed of a composite material including a thermoplastic matrix and a reinforcing material;
   determining a flat geometric pattern that generally corresponds to the desired shape of the first duct segment; and
   cutting the flat thermoplastic laminate sheet according to the flat geometric pattern.

15. A method of forming a thermoplastic laminate preform according to claim 14, wherein said providing step comprises impregnating a reinforcement material with thermoplastic to form the flat sheet.

16. A method of forming a thermoplastic laminate preform according to claim 14, further comprising marking the sheet with construction data including at least one of a duct segment identification mark, an orientation mark, a radial alignment mark, a spud location mark, a detail location mark, and a cuff location mark.

17. A method of forming a thermoplastic laminate preform according to claim 14, wherein said determining step comprises calculating dimensions of the flat geometric pattern at least partially according to a sinusoidal curve based on a number of duct segments required to form an articulated duet, a curvature of the articulated duct, a diameter of an inlet of the articulated duct, a diameter of the outlet of the articulated duct, a radius of the duct segment, a desired location for the seam of the duct segment, a seam overlap, and a desired deformation of an end of the duct segement.

* * * * *

UNITED STATES PATENT AND TRADEMARK OFFICE
CERTIFICATE OF CORRECTION

PATENT NO. : 7,097, 804 B2
APPLICATION NO. : 10/216110
DATED : August 29, 2006
INVENTOR(S) : Frantz et al.

It is certified that error appears in the above-identified patent and that said Letters Patent is hereby corrected as shown below:

<u>Column 6,</u>
Line 27, "tat" should read --that--.

<u>Column 11,</u>
Line 18, "sewn" should read --seam--;
Line 25, "fanning" should read --forming--.

<u>Column 12,</u>
Line 19, "die" should read --the--;
Line 52, "duet" should read --duct--;
Line 56, "segement" should read --segment--.

Signed and Sealed this

Ninth Day of January, 2007

JON W. DUDAS
*Director of the United States Patent and Trademark Office*